United States Patent [19]
Steffens

[11] 3,826,291
[45] July 30, 1974

[54] DISPENSING VOLATILE HYDROCARBON FUELS

[75] Inventor: Lester R. Steffens, Darien, Conn.

[73] Assignee: Mobil Oil Corporation, New York, N.Y.

[22] Filed: Dec. 11, 1972

[21] Appl. No.: 313,721

[52] U.S. Cl. .................................. 141/59, 141/290
[51] Int. Cl. ............................................ B65b 31/00
[58] Field of Search .............................. 141/39–41, 141/52, 59, 97, 290, 310, 382–388, 390, 392; 222/484

[56] References Cited
UNITED STATES PATENTS

| | | | |
|---|---|---|---|
| 3,016,928 | 1/1962 | Brandt | 141/290 X |
| 3,181,729 | 5/1965 | Milonas et al. | 222/484 X |
| 3,566,928 | 3/1971 | Hansel | 141/97 |
| 3,581,782 | 6/1971 | Onufer | 141/59 |

Primary Examiner—Houston S. Bell, Jr.
Assistant Examiner—Frederick R. Schmidt
Attorney, Agent, or Firm—A. L. Gaboriault

[57] ABSTRACT

Escape of hydrocarbons to the atmosphere during dispensing of volatile hydrocarbon fuels is avoided by pumping vapor from the container to be filled concurrently with introduction to that container of hydrocarbon fuels which contain volatile components. Suitable apparatus for the purpose include a vapor pump driven by the shaft of the meter which operates an indicater of amount of liquid dispensed.

1 Claim, 2 Drawing Figures

PATENTED JUL 30 1974  3,826,291

DISPENSING VOLATILE HYDROCARBON FUELS

BACKGROUND OF THE INVENTION

This invention is concerned with methods and apparatus for dispensing hydrocarbon fuels which contain volatile components. For example, the "front end" of motor gasoline contains hydrocarbons as light as butane. The motor fuel is provided with a sufficient quantity of such light components to insure reliable starting of an engine powered thereby and clean burning of the fuel in the cylinders of an internal combustion engine to the maximum extent permitted by the engine design.

The volatile front end of gasoline provides vapors of such light components in any container in which it is stored, such as the fuel tank of an automotive vehicle. Upon filling of such a tank by introduction of additional liquid gasoline the hydrocarbon vapors are displaced and discharged to the atmosphere unless other provision is made.

Hydrocarbons in the atmosphere are presently a matter of concern because they are believed to contribute to irritating smog conditions. It thus becomes desirable to avoid discharge of such vapors.

Typical apparatus for dispensing gasoline to automotive vehicles involves apparatus including a pump drawing suction on an underground tank and discharging through a meter to a flexible hose with a nozzle adapted for insertion in the fuel tank of an automotive vehicle. The shaft of the meter drives a computer equipped with two output shafts, one of which drives an indicater of volume dispensed through the meter. The other shaft is driven through variable gearing to calculate total price of the dispensed product based on a fixed price per gallon.

SUMMARY OF THE INVENTION

According to the present invention, the output shaft of the meter in such dispensing equipment drives a positive displacement vapor pump which takes suction from a point in the fill pipe of a tank to be filled and delivers the pumped vapors back to the tank from which liquid product is supplied to the dispensing equipment.

While the invention is specifically illustrated herein with respect to a service station pump for dispensing gasoline to the fuel tank of an automotive vehicle, it will be readily understood that it is also applicable to such equipment as tank trucks by which product is conveyed to a service station, bulk plants at which tank trucks are loaded for transportation of product to service stations and the like and other equipment in which liquid hydrocarbons containing volatile components are transferred from one tank to another through a meter having an output shaft that may be used to drive a vapor pump.

Apparatus according to the present invention is adjusted to withdraw from a tank to be filled a volume of vapor equal to the volume of liquid delivered thereto and transfer the withdrawn vapor to the dispensing tank in a volume equal to the volume of liquid withdrawn from the supply tank.

BRIEF DESCRIPTION OF THE DRAWINGS

In the annexed drawing.

DESCRIPTION OF PREFERRED EMBODIMENT

Figure 1:
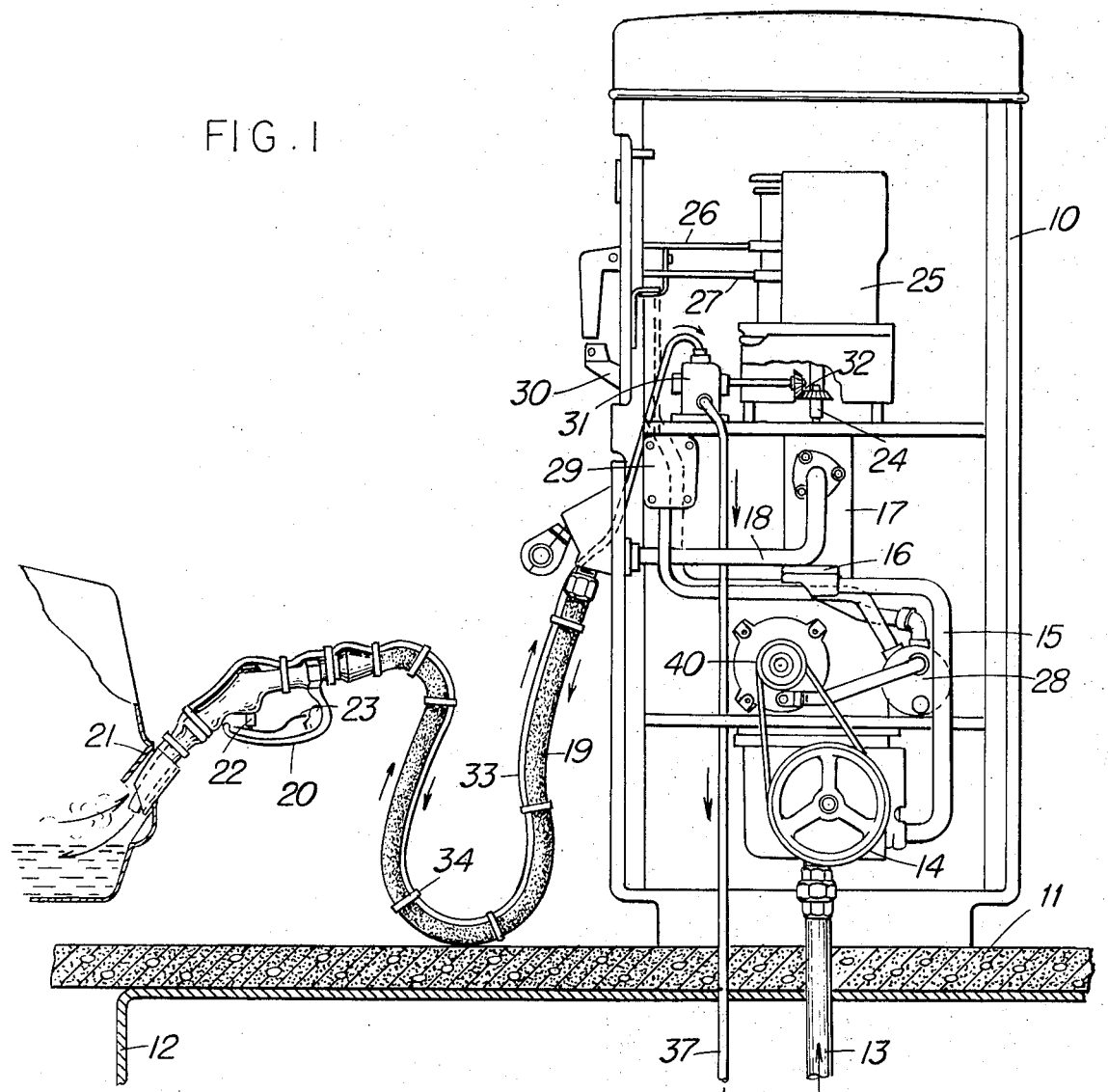
FIG. 1 is a view in elevation of a typical service station pump for dispensing gasoline with one side panel removed to show the internal structure. Also included in FIG. 1, is a representation of an automotive vehicle fuel tank with nozzle of the flexible hose from the pump inserted in the fill pipe.
Figure 2:
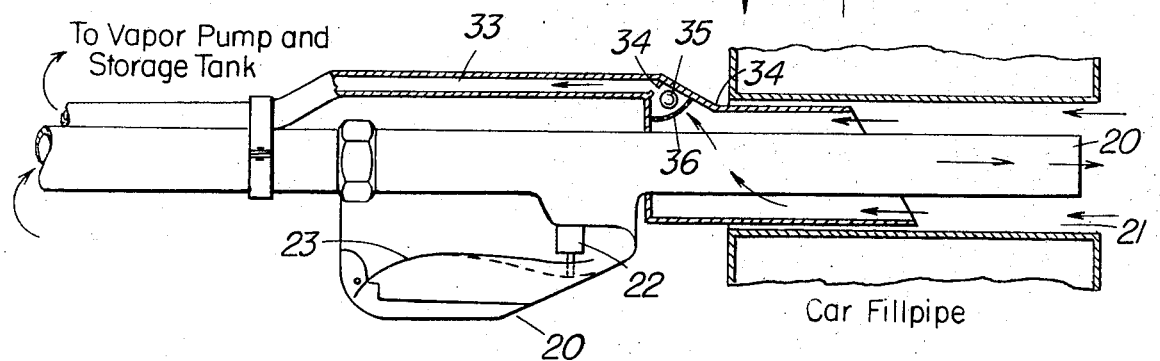
FIG. 2, is a view in partial section of a filling nozzle of the type utilized in the apparatus of FIG. 1.

Referring specifically to FIG. 1, a service station gasoline dispensing pump is mounted in a housing 10, on a concrete foundation 11, above a storage tank indicated generally at 12. The dispensing pump has a structure typical of present service station installations. A fuel suction line 13, extends to the bottom of tank 12, and is connected at its upper end to the suction side of pump 14, driven by motor 40.

Discharge from pump 14 is conveyed to pipe 15 to the inlet 16 of a meter 17. Discharge from the meter is conveyed by pipe 18 through the housing 10 to a flexible hose 19, terminating in a nozzle indicated generally at 20.

As shown in FIG. 1, the nozzle of the dispensing hose 19 is inserted into the fill pipe 21, of an automotive vehicle fuel storage tank. Fuel is supplied to that tank upon actuation of valve 22 by depressing the handle 23.

As gasoline is dispensed upon opening the valve 22, the flow of product through meter 17 causes shaft 24 to rotate, driving elements of the computer 25 to provide through shafts 26 and 27 output on quantity and price of product dispensed. Other elements shown in FIG. 1, include conduits for electrical connections meeting at junction box 28, and connecting with the motor 14, interlock 29 which prevents dispensing gasoline when the nozzle is mounted on support bracket 30, and also providing lights as needed for illumination of brand indicia and registers of volume and price.

According to the present invention, this conventional pump is modified by provision of a positive displacement vapor pump 31, driven from shaft 24 of the meter 17, as by bevel gears 32. The pump 31, may be of any suitable type, such as a vane pump and may be equipped for variable speed drive as by change of the bevel gears 32. In any event, the vapor pump 31, is calibrated to move a volume of vapor essentially equal to the volume of liquid flowing through meter 17.

Suction for vapor pump 31, is by a flexible hose 33, which may be advantageously affixed to the liquid dispensing hose 19, as by rubber rings 34. Vapor suction line 33 terminates in a shell 34 about the end of nozzle 20, short of the termination of that nozzle. As shown, the rearward portion of box 34 terminates in a throat connecting with vapor line 33. In order to avoid drawing liquid into the vapor line 33 when the automotive tank is overfilled, the throat is provided with a seat 34 for a ball float 35, normally supported on a mesh cage 36.

The discharge of vapor pump 31 is by pipe 37, to return the vapors to the underground storage tank 12.

It will be apparent that this arrangement accurately displaces an amount of vapor from the tank to be filled and back to the storage tank which is essentially equal to the volume of liquid moving from the storage tank into the tank to be filled. This avoids discharge of hydrocarbon vapors from the tank to be filled through the gap between the nozzle and fill pipe as liquid displaces those vapors and also avoids drawing air into the storage tank 12 in order to replace the liquid volume withdrawn therefrom. Replacement of the liquid in the storage tank with the mix of air and gasoline vapor precludes drawing air into the storage tank and thus minimizes evaporation losses from the storage tank.

This accuracy of transfer of vapors is accomplished because the vapor pump is driven directly by the shaft of a meter which rotates in exact concordance with the flow of liquid through the nozzle 20 when the valve is open.

I claim:

1. A motor fuel dispensing system for supply of motor fuel to the tank of an automotive vehicle while inhibiting discharge of hydrocarbon vapor to the atmosphere comprising:

a supply tank (12), a transfer pump (14) arranged and adapted to receive fluid at a suction port thereof and discharge the same through a discharge port thereof and a conduit (13) in liquid flow communication with the interior of said supply tank and the suction port of said transfer pump;

a meter (17) responsive to rate of liquid flow, a conduit (15) connecting the discharge port of said transfer pump with inlet of said meter, a conduit (19) connected to outlet of said meter and terminating in a nozzle (20) adapted for insertion to the fill pipe of an automotive vehicle (21) and a shaft (24) driven by said meter in exact concordance with flow of liquid through said nozzle;

a shell (34) about said nozzle terminating in an open end from which the nozzle protrudes, an outlet port from said shell remote from said open end and a check valve in said port arranged and adapted to permit flow of vapors therethrough and inhibit flow of liquids therethrough;

a positive displacement vapor pump (31) driven by said shaft, arranged and adapted to transfer a volume of vapor essentially equal to volume of liquid passing through said meter, a conduit (33) connecting the inlet of said vapor pump with the outlet port of said shell, and a conduit (37) connecting discharge of said vapor pump with the interior of said supply tank.

\* \* \* \* \*